United States Patent
Liu et al.

(10) Patent No.: US 11,973,582 B2
(45) Date of Patent: Apr. 30, 2024

(54) DETECTING TIME DELAY BETWEEN CIRCUITS TO ACHIEVE TIME SYNCHRONIZATION

(71) Applicant: Ciena Corporation, Hanover, MD (US)

(72) Inventors: Xiaojin Liu, Ottawa (CA); Kelly Donald Fromm, Bayview, ID (US); Daniel Lee, San Jose, CA (US); Vahid M. Naraghi, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 102 days.

(21) Appl. No.: 17/228,885

(22) Filed: Apr. 13, 2021

(65) Prior Publication Data
US 2022/0329339 A1    Oct. 13, 2022

(51) Int. Cl.
*H04J 3/06*    (2006.01)

(52) U.S. Cl.
CPC .......... *H04J 3/0682* (2013.01); *H04J 3/0617* (2013.01); *H04J 3/0644* (2013.01); *H04J 3/0667* (2013.01)

(58) Field of Classification Search
USPC .......................................................... 370/324
See application file for complete search history.

(56) References Cited

U.S. PATENT DOCUMENTS

| | | | |
|---|---|---|---|
| 4,891,649 A * | 1/1990 | Labaar | G01S 7/2921 342/175 |
| 5,321,541 A * | 6/1994 | Cohen | H04J 14/0227 398/92 |
| 7,760,723 B1 | 7/2010 | Daines et al. | |
| 7,764,621 B1 | 7/2010 | Busch et al. | |
| 7,782,856 B1 | 8/2010 | Larsen et al. | |
| 7,830,883 B1 | 11/2010 | Fromm et al. | |
| 7,948,874 B2 | 5/2011 | Tadimeti et al. | |
| 7,961,728 B2 | 6/2011 | Daines et al. | |
| 8,018,938 B1 | 9/2011 | Fromm et al. | |
| 8,024,683 B2 * | 9/2011 | Darsow | G06F 30/3312 716/108 |
| 8,094,559 B1 | 1/2012 | Bly et al. | |
| 8,149,839 B1 | 4/2012 | Hsu et al. | |

(Continued)

OTHER PUBLICATIONS

Ulf Parkholm, Ericsson, "Contribution to 802.3cx", IEEE 802.3 interim meeting Jan. 24, 2020, pp. 1-16.

(Continued)

*Primary Examiner* — Gregory B Sefcheck
*Assistant Examiner* — Majid Esmaeilian
(74) *Attorney, Agent, or Firm* — Baratta Law PLLC; Lawrence A. Baratta, Jr.

(57) ABSTRACT

Systems, circuits, and methods for synchronizing devices in the time-domain are provided. A method, according to one implementation, includes determining a round-trip number based on a width of one cycle of a timestamping clock signal. The round-trip number is equal to a plurality of times that a clock signal is to be transmitted in a loop from a timing-leader component to a timing-follower component and back to the timing-leader component. The method also includes utilizing the timestamping clock signal to detect a cumulative time delay that results when the clock signal is transmitted in the loop a number of times equal to the round-trip number. The cumulative time delay is configured to enable synchronization of the timing-follower component with the timing-leader component.

18 Claims, 4 Drawing Sheets

(56) References Cited

U.S. PATENT DOCUMENTS

| | | | |
|---|---|---|---|
| 8,199,750 | B1 | 6/2012 | Schultz et al. |
| 8,306,024 | B2 | 11/2012 | Fromm et al. |
| 8,379,676 | B1 | 2/2013 | Daines et al. |
| 8,886,878 | B1 | 11/2014 | Neudorf |
| 9,203,549 | B2 | 12/2015 | Holness et al. |
| 10,142,203 | B2 | 11/2018 | Jadav et al. |
| 10,594,395 | B2 | 7/2020 | Abdullah et al. |
| 2002/0089929 | A1 | 7/2002 | Tallegas et al. |
| 2011/0085545 | A1 | 4/2011 | Tadimeti et al. |
| 2012/0007645 | A1* | 1/2012 | Park ............... H03L 7/0818 |
| | | | 327/158 |
| 2019/0020417 | A1* | 1/2019 | Zhou ............... G01S 7/285 |
| 2019/0074818 | A1* | 3/2019 | Lal ............... H03H 9/131 |
| 2021/0006254 | A1* | 1/2021 | Kim ............... H03L 7/18 |
| 2021/0104976 | A1* | 4/2021 | Markulic ............ H03C 3/0941 |
| 2022/0124655 | A1* | 4/2022 | Liu ............... H04J 3/0685 |

OTHER PUBLICATIONS

International Telecommunication Union, ITU-T G.8273.2/Y.1368.2, Telecommunication Standardization Sector of ITU, "Timing characteristics of telecom boundary clocks and telecom time slave clocks for use with full timing support from the network", Oct. 2020, pp. 1-60.

* cited by examiner

Note: the link used for 1pps (1 pulse per second) in normal production while here it is "pulse" for measurement and the pulse width can be variable depending on the clock frequency

DETECTING TIME DELAY BETWEEN CIRCUITS TO ACHIEVE TIME SYNCHRONIZATION

TECHNICAL FIELD

The present disclosure generally relates to the synchronization of circuits in a system. More particularly, the present disclosure relates to measuring delay to improve timestamping accuracy between the circuits which are in need for time (ToD, time of day) synchronization.

BACKGROUND

Generally, various independent components require a certain level of clock or time synchronization in a telecommunication system. Without synchronization, it is possible for two connected system elements to encounter issues (e.g., performance degradation) when attempting to communication with each other. Clocks running on different system components may be designed to operate in unison, but, in reality, clocks may experience changes (e.g., drift) in frequency and/or phase, which may be caused by temperature variations or other factors (i.e, components upgrade, FPGA image rebuild) from time to time Telecommunication systems typically rely on a highly-accurate Primary Reference Clock (PRC) configured to control the clocks of dependent network components throughout the system to allow network components to run at identical frequencies. For example, atomic clocks are designed to meet extremely accurate timing standards and protocols for operation in various telecommunication systems. From the PRC or master clock, a slave device may be configured to synchronize its clock to the master clock using a process referred to as "clock recovery" to achieve frequency synchronization. For time (ToD) distribution, the high-precision of Primary Time Reference Clock (PRTC) is used as timing source and IEEE 1588 PTP packet are used to synchronize the time (ToD) between the master and slave.

For example, in the field of 5G Radio Access Network (RAN) applications, components may be required to meet very stringent clock specifications and protocols, such as Class C or D specifications described in G.8273.2 of the ITU-T. To meet these strict specifications, delay measurements and delay compensation actions need to be performed at each possible point that can introduce time errors. Also, the IEEE Standards Association is currently developing IEEE 802.3cx, which is related to improving the Precision Time Protocol (PTP) timestamping accuracy in the physical (PHY) level. However, the problem of timestamping accuracy has not been addressed on a system-level basis.

To perform time synchronization, conventional systems are typically designed to measure a one-shot round-trip delay where a timing signal is transmitted from a master to a slave and then transmitted from the slave back to the master in a single (one-shot) loop. However, this method only achieves a certain level of accuracy and will have a time error based on timestamping clock granularity. Thus, even if the one-shot round-trip method were to be repeated, the accuracy of these conventional strategies will not improve because of the time error of the timestamping clock granularity. For example, these conventional strategies will experience the same "beat effects" for each one-shot measurement.

Another issue with conventional systems is that there is a limited number of input and output pins on a chip or circuit board. Thus, some pins may need to be fixed to allow these one-shot round-trip measurements to be repeated. With the pin usage fixed in conventional systems, additional pins may be needed to cross-link between timing master devices and timing slave devices. However, in some cases, this may not be possible (e.g., in a chassis system with multiple line cards), which may require an increase in the number of pins, which may be costly to develop and produce.

Therefore, there is a need in the field of time synchronization systems for improving the timestamping accuracy of network components that are connected to each other. Also, there is a need in the field of time synchronization to allow accurate delay measurements without increasing the number of pins on circuits.

BRIEF SUMMARY

The present disclosure is directed to systems and methods for synchronizing circuits and systems in the time-domain. More particularly, the present systems and methods are configured to accurately detect time delays between a leader device and a follower device to enable synchronization at a precision within about 1-2 ns. Therefore, implementations described herein are able to improve system performance to meet the specifications and standards of Class C/D of ITU-T G.8273.2 and IEEE 802.3cx.

According to one implementation of the present disclosure, a circuitry includes a timing-leader component configured to create a timestamping clock signal and a pulse signal and a timing-follower component connected to the timing-leader component and configured to detect the signal and counter the delays from the timing-leader component. The timing-leader component is configured to determine a round-trip number based on a width of one cycle of the timestamping clock signal. The round-trip number is equal to a plurality of times that the clock pulse signal is to be transmitted in a loop from the timing-leader component to the timing-follower component and back to the timing-leader component. The timing-leader component is further configured to utilize the timestamping clock signal to detect a cumulative time delay that results when the clock pulse signal is transmitted in the loop a number of times equal to the round-trip number. Also, the cumulative time delay number is configured to enable synchronization of the timing-follower component with the timing-leader component.

According to another implementation of the present disclosure, a method includes a step of determining a round-trip number based on a width of one cycle of a timestamping clock signal, where the round-trip number is equal to a plurality of times that a pulse signal is to be transmitted in a loop from a timing-leader component to a timing-follower component and back to the timing-leader component. The method also includes the step of utilizing the timestamping clock signal to detect a cumulative time delay that results when the pulse signal is transmitted in the loop a number of times equal to the round-trip number. The cumulative time delay is configured to enable synchronization of the timing-follower component with the timing-leader component.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1A:
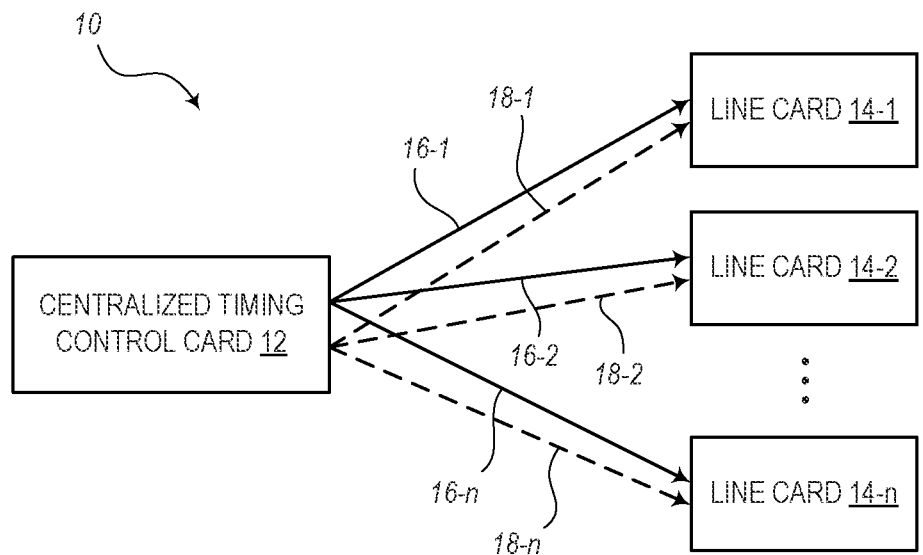
FIG. 1A is a block diagram illustrating circuitry where a timing-leader component is configured to control clock synchronization of multiple timing-follower components, according to various embodiments.

The present disclosure relates to systems and methods for improving delay measurement accuracy for synchronizing time on two connected devices in a system. A time delay is calculated as an accumulation of delays recorded over multiple loops between a timing leader (e.g., controller, master, clock source, etc.) and a timing follower (e.g., target, slave, receiver, etc.). Each round (or loop) utilizes a timestamping clock signal on the timing leader for measuring a round-trip delay. These round-trip delays are accumulated so they can be used for calculating the precision value of link delay. The number of round-trips is based on a width of one cycle of the timestamping clock signal. Also, the round-trip number is the number of times that the pulse signal is transmitted in the loop between the timing leader and the timing follower and back again.

The circuits (e.g., timing leaders and timing followers) may be configured as Field-Programmable Gate Arrays (FPGAs), Phase-Locked Loop (PLL) circuits, or other suitable circuit components or systems. In some embodiments, these timing circuits may be used in the field of telecommunications, such as 5G Radio Access Network (RAN) systems or time distribution network systems.

In particular, the timing circuits and systems described in the present disclosure may include a number of pins for communication to other components. Some of these pins, according to various embodiments, may be reconfigurable pins. For example, two reconfigurable pins may be configured in a test mode, as described with respect to the various implementations described in the present disclosure. After testing, these two reconfigurable pins may then be reconfigured in a normal operation mode to function as pins used according to normal operations. By reconfiguring these pins for the test mode, it is possible to reuse the pins for multiple uses and thereby avoid the need to create and designate additional pins for testing purposes. This, of course, can save on costs and development of new circuits. Also, these same pins may already be configured for distributing timing signals (e.g., frequency signals, Time of Day (ToD) signals, 1 pps signals, etc.).

For example, the ToD signals may be used to calculate the System Frame Number (SFN) and/or Node B Frame Number (BFN) of BFN number of Common Public Radio Interface (CPRI) devices. Also, the ToD may be needed for timestamping ports of timing leaders (masters), which can be controlled by a FPGA, while the ports of timing followers (slaves) could be from a switch of a different vendor.

Based on delay measurements, it is possible, according to the various embodiments of the present disclosure, to compensate for an accurate measurement of the delay to synchronize the timing followers with a timing leader in an accurate manner that would be configured to meet stringent clock standards for 5G Radio Access Network (RAN) applications, such as those defined by the Clock Class C and D of G.8273.2 of International Telecommunication Union (ITU) and IEEE 802.3cx.

More particularly, the process of transmitting the pulse signal in multiple round-trips between the timing leader and timing follower is configured to overcome any deficiencies in the synchronization caused by differences in frequency. In other words, any slight difference in frequency can create a "beat effect," which can be overcome by continuously looping through the round-trip a number of times. Also, by re-purposing the pins of the timing leader and timing follower, the repeated round-trips can be done in sequence to obtain an accumulation of delays that is an accurate representation of the actual delay to a fine resolution. A clock cycle value (or loop number), designated by the character N and defined in the present disclosure, can be calculated based on the period of the timestamping clock signal. This value N is used to represent the number of times that the pulse signal makes the round trip between the timing leader and timing follower during the test.

In some embodiments, the procedures described in the present disclosure may be incorporated in various timing, timestamping, and/or synchronization standards, such as ITU-T SG15 for delay compensation and measurement.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1A is a block diagram illustrating an embodiment of a system 10 that may be configured to operate in a telecommunication network. For example, the system 10 may be configured in a single chassis of a network element or node within the telecommunication network. In this embodiment, the system 10 includes a centralized timing control card 12 and a plurality of line cards 14-1, 14-2, . . . , 14-n. The centralized timing control card 12 and line cards 14 may include circuitry for enabling clock synchronization. The centralized timing control card 12 may be implemented as a timing-leader component that is configured to control clock synchronization of the line cards, which may be implemented as timing-follower components.

In this arrangement, the system 10 may be configured such that the centralized timing control card 12 can provide a frequency signal (e.g., 25 MHz, 125 MHz, etc.) along a backplane links 16-1, 16-2, . . . , 16-n for controlling the line cards 14. Additionally, the centralized timing control card 12 may be configured to provide a ToD serial string to the line cards 14 along backplane links 18-1, 18-2, . . . , 18-n. In some embodiments, the centralized timing control card 12 may also provide a 1 pps signal along backplane links 18.

Figure 1B:
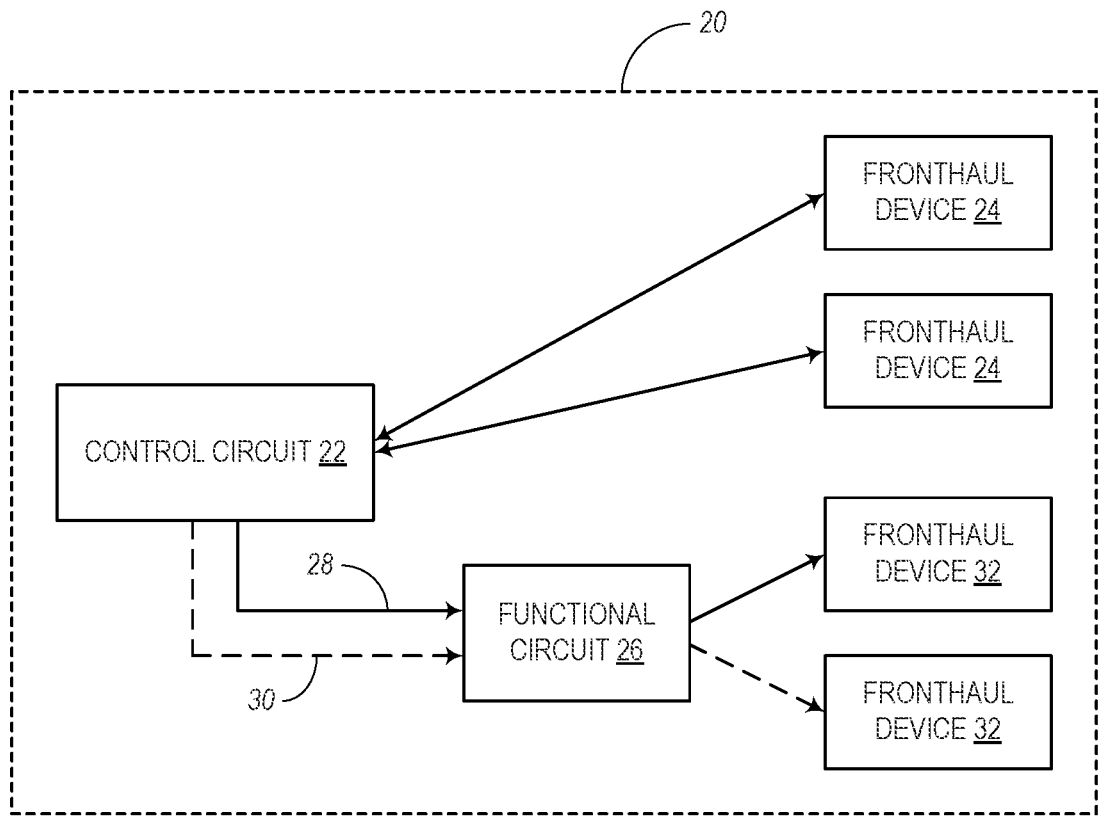
FIG. 1B is a block diagram illustrating circuitry where a timing-leader component is configured to provide reference timing signals to ports of fronthaul devices and to provide reference timing signals and timestamping clock signals to a timing-follower component, according to various embodiments.

FIG. 1B is a block diagram illustrating an embodiment of a circuit board 20 (e.g., printed circuit board) having timing-leader (master) circuitry and timing-follower (slave) circuitry. In this embodiment, a control circuit 22 may be arranged on the circuit board 20 for controlling clock signals on the circuit board 20. The control circuit 22, for example, may be a FPGA circuit, a PLL circuit, a servo, a timewheel, or other suitable circuit or device for controlling timing signals. The control circuit 22 may be referred to as a timing-leader component and may be configured to provide reference timing signals to ports of fronthaul devices 24 and to provide reference timing signals and timestamping clock signals to a functional circuit 26 (e.g., timing-follower component, functional FPGA circuit, etc.). In some embodiments the control circuit 22 and functional circuit 26 may be implemented as Field Replaceable Units (FRUs) on the circuit board 20.

The control circuit 22 (similar to the centralized timing control card 12 shown in FIG. 1A) may be configured to provide a frequency timing signal along a first backplane link 28 to the functional circuit 26 and provide a ToD serial string along a second backplane link 30 to the functional circuit 26. In turn, the functional circuit 26 may be configured to provide timing control signals to ports of fronthaul devices 32. The control circuit 22 (e.g., servo/timing control component, FPGA, PLL, etc.) provides timing and clock information (e.g., ToD, 1 pps, etc.) which are recovered on the functional circuit 26, and then this timing and clock information can be replicated to the other components (e.g., fronthaul device 32) for timestamping or other functionalities, such as the calculation of SFN/BFN in an Open RAN (O-RAN) environment.

The system 10 of FIG. 1A and the circuit board 20 of FIG. 1B may be incorporated at various levels in a 5G RAN system. Various timing control procedures, as described below, may be configured to the specification of G.8273.2 of ITU-T and IEEE 802.3cx. The delay measurements and compensation can be performed at each possible point in the system where timing errors may be introduced to address these timing errors on system-wide level. Thus, timing control may be performed on a chassis system (e.g., system 10) with the centralized timing control card 12 and then the timing information to be distributed to the line cards 14 where the timestamping will be done. Also, timing control may be performed in a single system (e.g., in the circuit board 20) with the control circuit 22 (e.g., timing control component, timing FPGA/PLL, or the like) distribute the timing and clock information to the other components (i.e., the functional circuit 26, another FPGA, a FRU removably attached to the circuit board 20, etc.) where the timing and clock information matches the timing FPGA. It should be noted that, between the source of timing (e.g., components 12, 22) and the target of the timing information receiver (e.g., components 14, 26), at least two links exist to transfer the timing information. One link (e.g., components 16, 28) transfers the frequency information, and the other link (e.g., components 18, 30) transfers the ToD and/or 1 pps information.

The timing distribution normally includes:
1) a frequency, such as 25 MHz, 125 MHz, etc. within a first backplane link (e.g., links 16, 28),
2) a Time of Day (ToD) serial string within a second backplane link (e.g., links 18, 30), and
3) optionally, 1 pps information within the second backplane link.

Nevertheless, there is delay between the timing source (e.g., components 12, 22) and the timing target (e.g., components 14, 24), either due to processing of signals to be transferred and/or the delay of the signal traversing the link. This delay may be calculated. Quite often, the delay may be measured using the optional 1 pps signal to go through a round-trip delay. To measure the delay very accurately, however, the "beat effect" needs to be removed, as described in the present disclosure. The simple round-trip delay measurement for one loop, as is common in conventional systems, will not be able to achieve the elimination of the beat effect and can only provide a certain level of accuracy. For example, the "beat effect" introduces a time error that is described by C1605 of ITU-T SG15/Q13.

Figure 2:
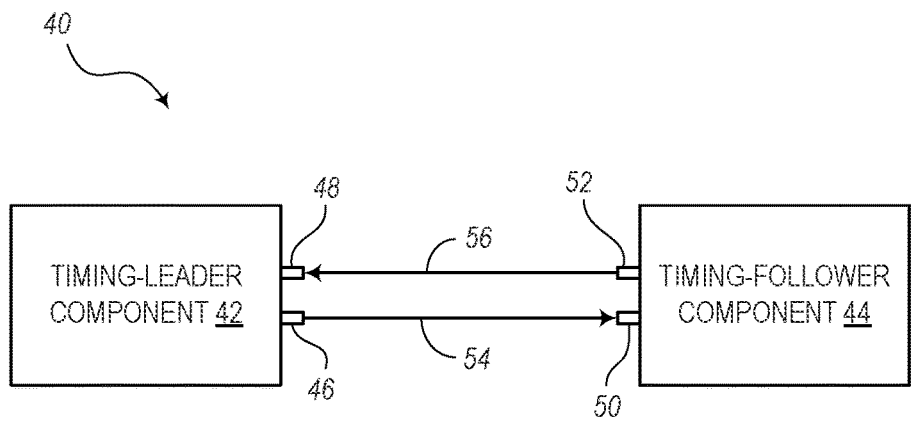
FIG. 2 is a block diagram illustrating general circuitry where a timing-leader component and a timing-follower component include reconfigurable pins to enable the components to operate in either a test mode or a normal operation node, according to various embodiments of the present disclosure.

FIG. 2 is a block diagram illustrating an embodiment of general circuitry 40 where a timing-leader component 42 and a timing-follower component 44 include reconfigurable pins to enable the components to operate in either a test mode or a normal operation node. According to some embodiments, the timing-leader component 42 may represent the centralized timing control card 12 operating in the system-level of FIG. 1A and/or the control circuit 22 operating in the board-level of FIG. 1B. Also, the timing-follower component 44 may represent one or more of the line cards 14-1, 14-2, . . . , 14-n operating in the system-level of FIG. 1A and/or the functional circuit 26 operating in the board-level of FIG. 1B. In some embodiments, the timing-leader component 42 and/or the timing-follower component 44 may be configured as FPGA devices, PLL devices, functional FPGA devices, etc.

The timing-leader component 42 may include, among other things, reconfigurable pins 46, 48 (or ports). Also, the timing-follower component 44 may include, among other things, reconfigurable pins 50, 52 (or ports). In normal operation, the pin 46 of the timing-leader component 42 may be configured for transmitting the ToD serial string and/or 1 pps signal, and the pin 48 may be configured for transmitting the frequency signal. Also, in normal operation, the pin 50 of the timing-follower component 44 may be configured for receiving the ToD serial string, 1 pps signal, and frequency signal, and the pin 52 may be configured for functions independent of clock synchronization.

According to the measuring and testing functions described in the present disclosure, the timing-leader component 42 and timing-follower component 44 are configured to communicate over a first backplane (or control plane) link 54 and a second backplane (or control plane) link 56. Particularly, the first backplane link 54 connects the port 46 of the timing-leader component 42 with the port 50 of the timing-follower component 44, and the second backplane link 56 connects the port 48 of the timing-leader component 42 with the port 52 of the timing-follower component 44. It should be noted that the link 56 connecting pins 48, 52 may be configured as bi-directional link. Therefore, in a delay measuring mode, signals may be transmitted from the follower to the leader, and, in a normal operating mode, signals may be transmitted from the leader to the follower (as shown in FIGS. 1A and 1B).

The general circuitry 40 of FIG. 2 is shown in the testing mode where the pins 46, 48, 50, 52 are configured such that timing control signals can be transported from the pin 46 of the timing-leader component 42 to the pin 50 of the timing-follower component 44 (i.e., in a left-to-right direction on the page). Also, the timing control signals can be transported in the reverse direction from the pin 52 of the timing-follower component 44 to the pin 48 of the timing-leader component 42 (i.e., in a right-to-left direction on the page). Transmission of a timing signal (e.g., the 1 pps signal) from pin 46 to pin 50 and then from pin 52 to pin 48 may be considered to be one round-trip or one loop. According to the various embodiments of the present disclosure, the pulse signal may be configured to complete multiple round-trips (or loops) in this regard, as opposed to the simple one round-trip technique that is often used in conventional systems.

Figure 3A:
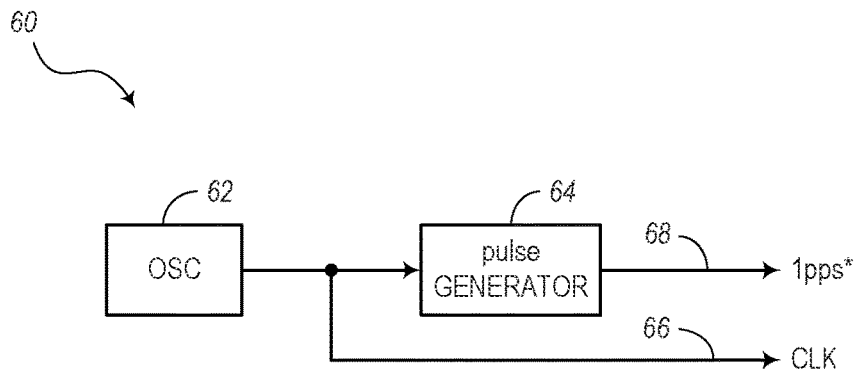
FIGS. 3A and 3B are block diagrams illustrating clock sources for producing both a timestamping clock signal and a pulse signal, according to various embodiments.
Figure 3B:
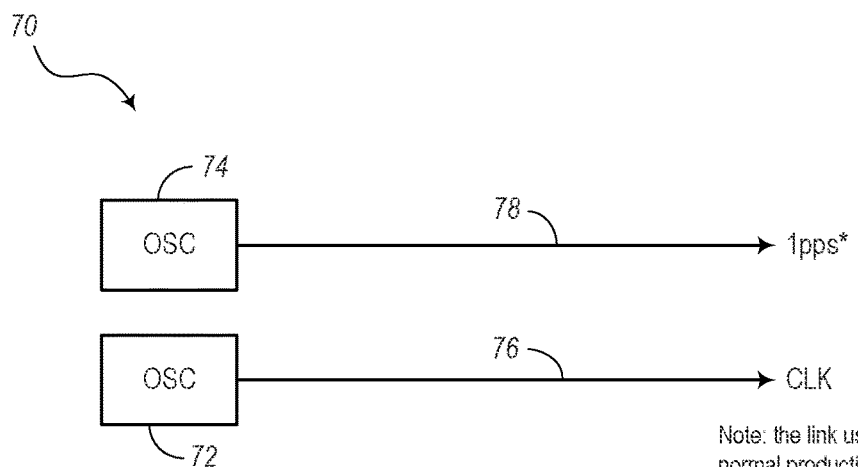

FIGS. 3A and 3B are block diagrams illustrating two embodiments of clock sources 60, 70 for producing both a timestamping clock signal and a pulse signal. One of the clock sources 60, 70 may be incorporated in the timing-leader component 42 shown in FIG. 2 for creating the clock signals. In some embodiments, the clock sources 60, 70 may be configured to provide a Time of Day (ToD) signal that is based on a world clock, a Global Positioning System (GPS) clock, etc.

In FIG. 3A, the clock source 60 includes a single oscillator 62 (e.g., Oven-Controlled Crystal Oscillator (OCXO), etc.) and a pulse generator 64 configured to divide the clock output from the single oscillator 62. The single oscillator 62 is configured to output a first clock signal (CLK) on a first clock bus 66 for use by the timing-leader component 42 shown in FIG. 2. The 1 pps generator 64 is configured to output a pulse signal on a second clock bus 68 for use by the timing-leader component 42.

In FIG. 3B, the clock source 70 includes a first oscillator 72 and a second oscillator 74. The first oscillator 72 may be a normal crystal oscillator and the second oscillator 74 may a fine-tuned oscillator (e.g., atomic clock oscillator, OCXO, etc.). The first oscillator 72 is configured to output a first clock signal (CLK) on a first clock bus 76 for use by the timing-leader component 42 shown in FIG. 2. The second oscillator 74 is configured to output a pulse signal on a second clock bus 78 for use by the timing-leader component 42.

Figure 4:
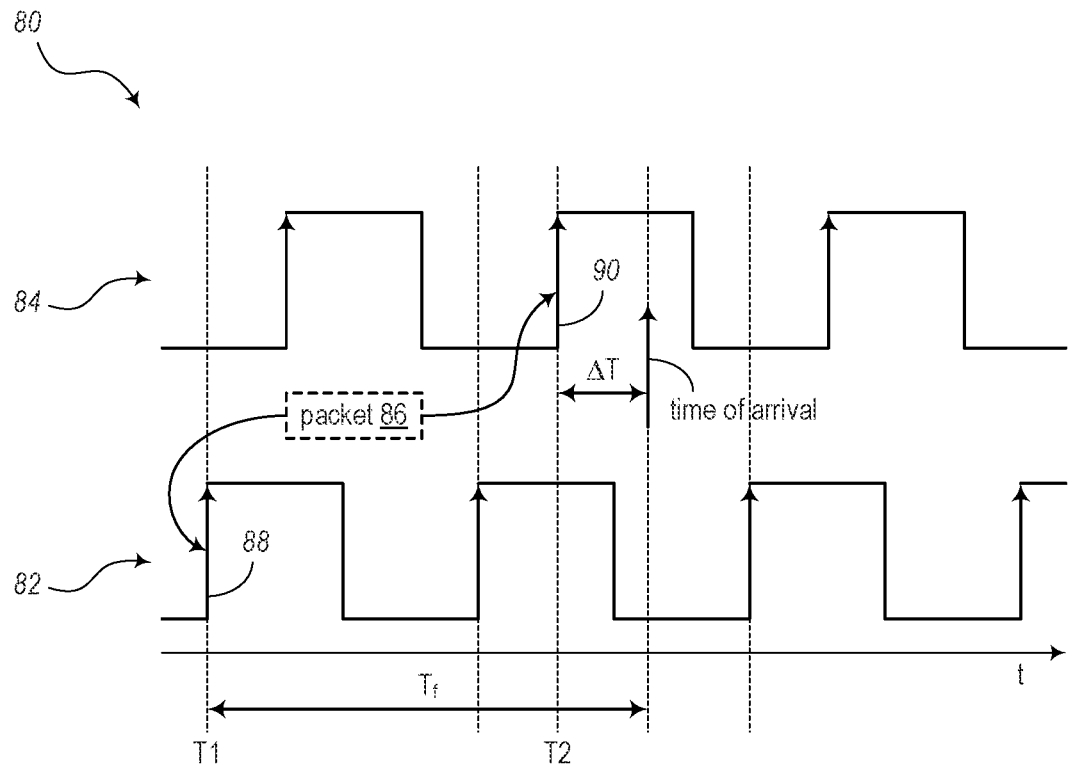
FIG. 4 is a diagram illustrating an example of pulses of a timestamping clock signal associated with the timing-leader component shown in FIG. 2 and pulses of a timestamping clock signal associated with the timing-follower component shown in FIG. 2, according to various embodiments.

FIG. 4 is a diagram showing a graph 80 of a first pulse stream 82 and a second pulse stream 84 according to one example where a system or circuit board includes two connected circuits (e.g., as shown in FIGS. 1A, 1B, and/or 2). The graph 80 may be used as an example to describe the operations of the systems and methods of the present disclosure for synchronizing clock of the two connected circuits. The first pulse stream 82 represents the pulses of a timestamping clock signal (e.g., CLK) associated with the timing-leader component 42 shown in FIG. 2. The second pulse stream 84 represents the pulses of a timestamping clock signal associated with the timing-follower component 44 shown in FIG. 2. In this example, the first and second pulse streams 82, 84 have a phase difference ($\Delta\theta$). The first and second pulse streams 82, 84 may be syntonized (i.e., having the same frequency, but not necessarily the same phase) or may have different frequencies, which may be caused, for example, by temperature changes and other factors of the crystal oscillators of the respective leader/follower circuits.

As shown in FIG. 4, a packet 86 is timestamped with time T1 as it is transmitted from the leader (e.g., timing-leader component 42). The packet 86 leaves on the rising edge 88 of the timestamping clock signal from the leader. The timestamp T1 has no granularity associated with it because of the assumption that the time-of-departure is aligned with the rising edge 88 of the timestamping clock.

The packet 86 arrives at the receiver (e.g., timing-follower component 44, slave device, etc.) after a certain time delay, referred to herein as the flight time ($T_f$). At the receiver, there is a certain amount of timestamping granularity error ($\Delta T$) between the point in time when the packet 86 is actually received and the rising edge 90 of a respective pulse of the second pulse stream 84. This timestamping granularity error $\Delta T$ usually results in many cases since there is no guarantee that the time-of-arrival (T2) of the packet 86 will be in alignment with the rising edge 90 of the timestamping clock (e.g., second pulse stream 84) of the receiver/follower. The timestamp T2 associated with the time-of-arrival will be the value of the clock at the closest rising edge 90 prior to the time-of-arrival.

If the leader and follower are substantially syntonized (i.e., having substantially the same frequency, but not necessarily the same phase), then the timestamping granularity error $\Delta T$ will essentially be constant from one packet to another. The implication of syntonization is that when conventional timestamping methods are used, the error signal is usually constant. However, syntonization cannot be assumed and therefore the processes of the present disclosure are configured to address this issue.

In order to handle the condition when there is a small offset in frequency between the first and second pulse streams 82, 84 of the timestamping clocks of the two devices, some wander may result. This frequency wandering situation may result from various causes. Thus, the granularity noise spectrum may not be a constant value (i.e., pure impulse function), but will normally have a very narrow bandwidth. This will result in a "beating effect" between the two devices (e.g., leader and follower).

This "beat effect" can apply to a pulse when the round-trip delay measurement is conducted, as the flight time $T_f$ for the pulse is always fixed and the accuracy error introduced by the latching clock granularity will range from 0 to 1 along the entire clock cycle. It is possible to calculate the range of possible delays as the inverse of the frequency (i.e., frequency*delay=1). For example, if the clock signal includes a frequency of 125 Mhz, the accuracy of the delay will be 8 ns (or ranging from 0 to 8 ns) which can be quite significant compared to Class C and Class D requirements.

The present disclosure provides systems and methods for accurately measuring the delay (e.g., much greater than the 8 ns granularity) and remove this "beat effect." Specifically, the processes of the present disclosure include looping the pulse signal to be measured continuously during this testing period. After testing, the links 54, 56 shown in FIG. 2 can be reconfigured for normal operation. Therefore, instead of a single one-shot approach as is common in conventional system, or instead of repeating the same one-shot at distinct time intervals to arrive at the same errors, the present disclosure provides embodiments to allow the pulse signal to be looped between the leader and follower multiple times. It should be noted that the conventional process of repeating the same round-trip measurement does not get rid of the "beat effect" timing error. Also, the embodiments of the present disclosure further include a detector and a dedicated memory device in the timing leader component 42, whereby the detector is configured to calculate the number of times that the pulse signal traverses the loop and the dedicated memory device may include a register configured to store the number of loops (or round-trips) of the pulse signal.

Figure 5:
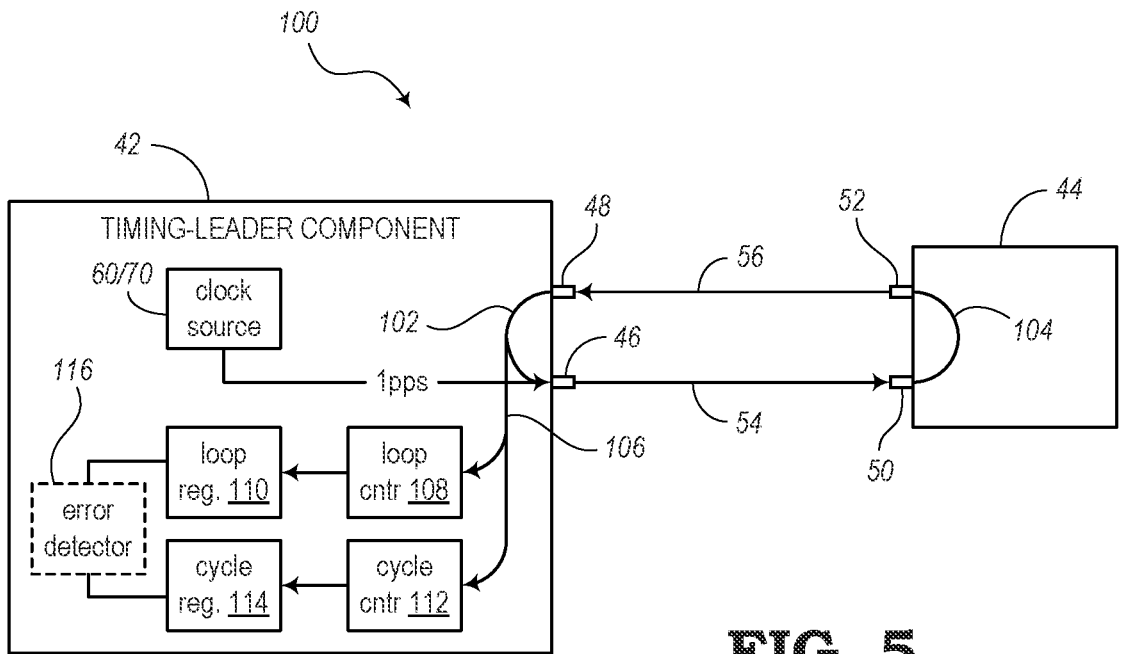
FIG. 5 is a diagram illustrating aspects and operations of the general circuitry of FIG. 2, according to various embodiments of the present disclosure.

FIG. 5 is a diagram illustrating an example of various aspects and operations of circuitry 100, which may include the general circuitry 40 of FIG. 2. Again, the circuitry 100 (or general circuitry 40) includes the timing-leader component 42 and the timing-follower component 44 configured to communicate with each other using, among other paths, links 54, 56 in a backplane or control plane of a network. The timing-leader component 42 includes one or more clock sources (e.g., clock sources 60, 70 of FIGS. 3A and 3B) for producing a main clocking signal (CLK) for providing an indication of frequency and a pulse signal. These clocking signals may be applied to clock buses 66, 68, 76, 78 as mentioned above and made available for synchronization purposes as described in the present disclosure.

In conventional systems, the two pins 46, 48 shown in FIG. 2 are used for directing the frequency signal and a ToD signal from the timing-leader component 42 to the timing-follower component 44. However, in the present disclosure, the pins 46, 48 are re-purposed or reconfigured for the testing procedures described herein. For example, instead of the frequency signal and ToD signal being directed in one direction (i.e., from the leader to the follower), some embodiments of the present disclosure include the use of just the pulse signal where the pin 46 is reconfigured as an output pin for sending the pulse signal along the link 54 and the pin 48 is reconfigured as an input pin for receiving the pulse signal that is returned from the follower device along the link 56. Similarly, the pins 50, 52 of the timing-follower component 44 are reconfigured for receiving the pulse signal on the pin 50 and outputting the same pulse signal back to the timing-leader component 42 from the pin 52. The pins 46, 48, 50, 52 can be re-purposed or reconfigured in this manner for the purpose of enabling the delay measurement processes described herein to synchronize the clocks of the respective devices 42, 44 more accurately than what is possible with conventional systems.

In addition to re-purposing the pins, each of the timing-leader component 42 and timing-follower component 44 are re-purposed to include shorts between their respective pairs of input and output pins. For example, a first short 102 (e.g., internal to the timing-leader component 42) may be connected between pin 48 (i.e., input test pin) and pin 46 (i.e., output test pin). Also, a second short 104 (e.g., internal to the timing-follower component 44) may be connected between pin 50 (i.e., input test pin) and pin 52. These shorts 102, 104 may be configured to immediately cause the pulse signal to be looped back in the other direction with little or no delay. It should be noted that the shorts 102, 104 do not include any processing or buffering actions and therefore do not add to the delay that may be experienced in conventional tests. The links 54, 56 and shorts 102, 104 therefore create a testing loop such that one trip around the loop (i.e., from pin 46 along link 54 to pin 50, along short 104 to pin 52, along link 56 to pin 48, and along short 102 to pin 46) is one round-trip.

Furthermore, the timing-leader component 42 of the circuitry 100 includes a test link 106 for receiving the pulse signal from the short 102 as the pulse signal is being applied back to the pin 46 during the testing stage. The test link 106 applies a copy of the pulse to a loop counter 108, which is configured to count the number of times that the pulse is detected. Thus, after the initial single application of the pulse by the clock source 60, 70, the loop counter 108 is configured to count the round-trips that the pulse makes around the loop. The count number (e.g., loop number, round-trip number, etc.) may be stored in a register 110, which may be used in the calculation of the total or cumulative delay.

In addition, the pulse signal observed on the test link 106 is also applied to a cycle counter 112, which is configured to utilize the timestamping signal (CLK) for determining a number of cycles of the timestamping signal that are completed between each round-trip. Each count of the cycle counter 112 is applied for storage in a cycle register 114. In addition to counting the number of cycles, the cycle counter 112 is also configured to determine when a rising edge of the detected pulse signal is substantially aligned with the rising edge of the timestamping signal. When the pulse signal and timestamping signal are substantially aligned (after a number of round-trips), the cycle counter 112 may be configured to cause the testing circuitry to stop the monitoring processes (e.g., by disconnecting the short 102).

The timing-leader component 42 may also include a granularity error detector 116 that is configured to receive the loop count from the loop register 110 and the cycle count from the cycle register 114. When the test is complete (e.g., when the pulse signal is aligned with the timestamping signal), the granularity error detector 116 is configured to calculate a cumulative time delay equal to the amount time that it took for the pulse signal to traverse the multiple loops. Based on this cumulative time delay and a factor (N) that is based on the frequency of the timestamping signal, the granularity error detector 116 is configured to determine a precise granularity error to calculate a single one-way delay. The single one-way delay is the amount of time that is takes for a signal to be transmitted from the timing-leader component 42 to the timing-follower component 44. In alternative embodiments, a user may be configured to access the registers 110, 114 to determine the granularity error without the granularity error detector 116. In still other embodiments, the granularity error detector 116 may be arranged in an external device that is connected to the timing-leader component 42.

In some embodiments, the granularity error may be calculated in the manner described in the present disclosure to achieve an accurate measurement of delay (i.e., within an accuracy on the order of about 1-2 ns). The accuracy of this detection allows the synchronization of the timing-follower component 44 to essentially eliminate the beat effect when the components 42, 44 are not syntonized.

Therefore, the process for performing the delay measurement includes:

1) Re-purposing the pins and connecting the shorts, as described above;

2) Generating the pulse signal (by the timing-leader component 42) and latching a timestamp (T1) representing the time when the 1 pps signal is initially transmitted;
3) Looping the pulse from the follower back to the leader;
4) Latching a pulse timestamp to determine a number of timestamping signal cycles were completed during the previous loop, counting the loop, and looping the pulse from the leader back to the follower;
5) Repeating steps 3 and 4 until the loop counter reaches a value "N" and then stopping. The "N" is a number configured before the pulse is initially transmitted and is based on the frequency of the timestamping signal. A final timestamp T2 is detected such that a total (or cumulative) delay of T2-T1 can be determined and recorded; and
6) Calculate the round-trip delay Delay_Round_Trip= (T2−T1)/N and then divide the Delay_Round_Trip by 2 to determine a one-way time delay. As mentioned above, these calculations may be performed by an on-board detector (e.g., granularity error detector 116), by an external device having access to the registers 110, 116, or by a user (also having access to the registers 110, 116).

Figure 6:
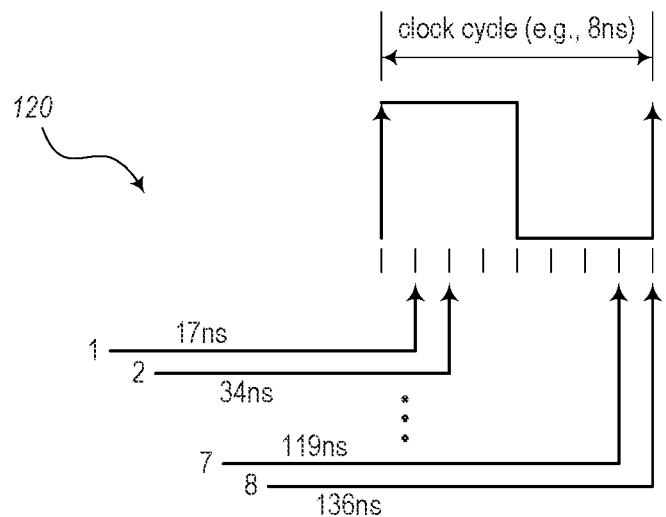
FIG. 6 is a diagram illustrating an example of an accurate delay measurement procedure for detecting a cumulative time delay obtained over multiple loops between the timing-leader component and timing-follower components shown in FIGS. 2 and 5, according to various embodiments.

FIG. 6 is a graph 120 showing an example of phase aspects of the delayed pulse signal with respect to the timestamping signal. In this example, an accurate delay measurement procedure can be performed for detecting a cumulative time delay obtained over multiple loops between the timing-leader component and timing-follower components shown in FIGS. 2 and 5. According to this example, the timestamping signal is a clock signal having a frequency equal to 1/N where N is the width (in the time-domain) of one clock cycle of the timestamping signal. The N is the width in nanoseconds. Thus, for a timestamping signal with a frequency of 125 MHz, N would be 8 (i.e., 8 ns cycle). Also, the test includes looping the pulse 1 pps signal a number of times between the leader and follower, where the number of loops is equal to N. Thus, in the example of a 125 MHz timestamping signal, N would be 8, and the 1 pps signal would be configured to complete 8 round-trips. The repeating of the loop this number of times enables the beat effect to essentially be eliminated.

In the graph 120 shown in FIG. 6, results of phase offsets are shown in order that the delay can be measured accurately. Again, the 125 MHz clock is used, and therefore N=8 (8 ns cycle). In conventional systems, there may potentially be the introduction of a timing error that could range anywhere between about 0-8 ns. In this example, the round-trip delay (unknown until later calculations) is 17 ns. Thus, with the clock cycle of the timestamping signal being 8 ns, the cycle counter 112 may be configured to count two complete cycles. Plus, there will be an offset of 1 ns (which may be determined later). Thus, the first loop of the 1 pps signal includes two cycles of the timestamping signal plus the extra 1 ns error. The second loop (i.e., 34 ns) completes two more timestamping cycles and includes an error of 2 ns. This is completed until the 1 pps signal completes 8 (N=8) round-trips. At this last loop (i.e., 136 ns), three timestamping cycles can be counted, which include the two complete cycles plus the portions of the 8 errors (partial cycles) for each of the previous loops. After 8 round-trips, the cumulative time delay (136 ns) can be used to determine a single round-trip delay and/or the one-way delay . . . .

If only one loop is measured, the time error will be 1 ns and observable delay has a value of 16 ns. From this, a one-way delay of 8 ns can be calculated. It can be observed (although not necessarily detectable at this point) that the first loop has a delay of 17 ns obtained with a timestamping cycle of 8 nm. Thus, 17 divided by 8 (without the remainder) give a value of 2, which represents the number of total cycles of the timestamping signal. The remainder in this case can be determined by using the modulo operation 17mod 8=1. The remainder of 1 can be interpreted as a time error of 1 ns. The second loop has a delay 17*2 (i.e., 34 ns) and 34/8 provides a whole value of 4 (i.e., 4 timestamping cycles) and a remainder of 17*2mod8=2 (i.e., 2 ns error). This can be repeated for each loop. For example, the seventh loop results in a delay 17*7 (i.e., 119 ns) and 119/8 provides a whole value of 14 (i.e., 14 cycles) and a remainder of 17*7mod 8=7 (i.e., 7 ns error). Finally, the eighth and final loop (since N=8) has a delay of 17*8 (i.e., 136 ns) and 136/8 provides a whole value of 17 (i.e., 17 cycles) and a remainder of 17*8mod 8=0 (i.e., no timing error). The formula (M*N) modN for the last loop will provide a remainder (error) of 0 and the rising edge of the 1 pps signal will be aligned with the rising edge of the timestamping signal. After looping N times (N=8 in this example), the cumulative time delay is 136 ns. The round-trip delay of 17 ns can be calculated by dividing 136 by 8. Therefore, the one-way delay from the leader to the follower can be calculated as 17/2=8.5 ns, which can be calculated to such an accuracy so as to essentially eliminate the "beat effect" time error.

According to various embodiments of the present disclosure, the design hardware may include two components (e.g., FPGAs, PLLs, or other devices utilizing clock-based signals). One component (e.g., timing-leader component 42) is a master of timing information for creating and distributing a clock signal that other circuit may rely on. The other component (e.g., timing-follower component 44) is a slave of the timing information for receiving the timing information and operating under this received timing information.

There are two I/O pins on each component. On the master, there is one output and one input. On the slave, there is one input and one output. Also, there are two connections (e.g., links 54, 56) bridging the two components for timing information distribution. In the present disclosure, the links 54, 56 are configured to looping the 1 pps signal between the components.

Furthermore, there is a clock that can be a stable oscillator (e.g., an OCXO) that is configured to run, or the master can receive an external input reference clock (e.g., 1 pps clock) locked to the master clock. The stable oscillator can be divided down to generate the 1 pps pulse and can also be used to timestamp the 1 pps pulse when it is looped during the testing mode. According to various embodiments, the master is configured to generate just a single 1 pps pulse that loops multiple times.

Also, the master includes two registers 110, 114. which may be configured as read/write elements or read-only elements. The loop register 110 is configured to record the number of loops. Also, the loop register 110 may store the loop number (N) that is based on the width of the cycle of the timestamping signal. The cycle register 114 is configured to record the number of cycles detected, which can be used to calculate the total or cumulative delay. In some embodiments, the information stored in the registers 110, 114 can be used by the granularity error detector 116 (or by other means) for calculating the one-way delay and for reading and debug purposes.

According to some embodiments, the operation of the circuitry may include the following processes:

1) A user configures the Loop-Number register by writing the value (which is equivalent to clock cycle width in nanoseconds);
2) The master generates the single 1 pps pulse which is sent over the output of one of the pins (e.g., pin 46);
3) The master uses the timestamping clock to timestamp the 1 pps pulse simultaneously while the 1 pps pulse leaves the output pin and saves this timestamp into the internal register as T1;
4) The slave "reflects" the 1 pps pulse from its input pin and to its output pin to return the 1 pps signal in a loopback direction. In some embodiments, the slave may also use detection circuitry (e.g., similar to the components 106, 108, 110, 112, 114, 116 of the master);
5) The master detects the 1 pps pulse from its input pin and uses the clock to timestamp the pulse and save/update the timestamp information into the internal register, which in some cases may be stored as T2 or an intermediate value of T2;
6) The master checks the cycling number. If the cycling number of the 1 pps pulse signal is less than the "loop number" in the register, then the master proceeds to loop back the 1 pps pulse to its output pin 46 for transmission again to the slave;
7) Steps 4) and 6) are repeated until the cycling number is same to the "loop number" in the register, and then the looping stops. At this point, the cycle register 114 can be updated to designate that it is the "total delay" or cumulative time delay, calculated as T2-T1; and
8) The user can retrieve the total-delay from the cycle register 114 and calculates the Loop_Delay (i.e., Loop_Delay=Total_Delay/Loop_Number) and/or a one-way delay (i.e., One-Way_Delay=Loop_Delay/2). Again, these values may be calculated by the granularity error detector 116 according to some embodiments.

Figure 7:
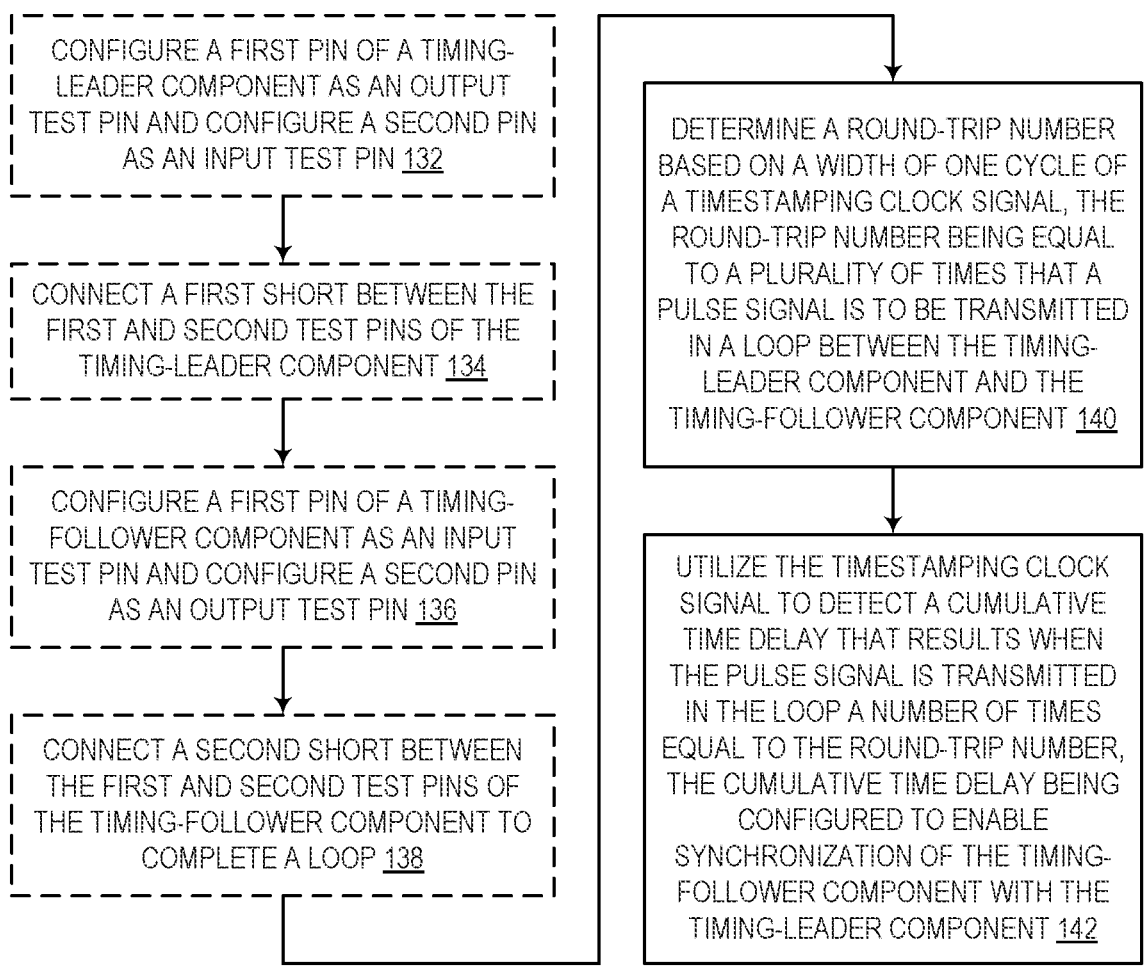
FIG. 7 is a flow diagram illustrating a process for time synchronization using the accurate delay measurement procedure shown in FIG. 6, according to various embodiments of the present disclosure.

FIG. 7 is a flow diagram illustrating an embodiment of a process 130 for clock synchronization using an accurate delay measurement procedure. The process 130 may be executed by a timing-leader component and a timing-follower component. For example, the timing-leader component may be configured to create a timestamping clock signal and a pulse-per-second (1 pps) clock signal. The timing-follower component may be connected directly to the timing-leader component and configured to be synchronized with the timing-leader component.

According to some embodiments, the process 130 may include a number of initial steps for configuring a loop between the timing-leader component and the timing-follower component. For example, the process 130 may include the pre-step of configuring a first pin of the timing-leader component as an output test pin and configuring a second pin of the timing-leader component as an input test pin, as indicated in block 132. The process 130 may also include the pre-step of connecting a first short between the first and second pins of the timing-leader component, as indicated in block 134. The process 130 may also include the pre-step of configuring a first pin of the timing-follower component as an input test pin and configuring a second pin of the timing-follower component as an output test pin, as indicated in block 136. Also, the process 130 may include the pre-step of connecting a second short between the first and second pins of the timing-follower component, as indicated in block 138. For example, the loop may therefore include a path from the first pin of the timing-leader component along a first link to the first pin of the timing-follower component, along the second short to the second pin of the timing-follower component, along a second link to the second pin of the timing-leader component, and along the first short to the first pin of the timing-leader component.

In one embodiment of FIG. 7, with the loop between the timing-leader component and timing-follower component established (pre-steps 132, 134, 136, 138), the process 130 includes a step (block 140) of determining a round-trip number based on a width of one cycle of a timestamping clock signal, whereby the round-trip number may be equal to a plurality of times that a pulse-per-second (1 pps) clock signal is to be transmitted in the loop from a timing-leader component to a timing-follower component and back to the timing-leader component. The process 130 also includes the step (block 142) of utilizing the timestamping clock signal to detect a cumulative time delay that results when the 1 pps clock signal is transmitted in the loop a number of times equal to the round-trip number. The cumulative time delay may be configured to enable synchronization of the timing-follower component with the timing-leader component.

The process 130 may also include the step of re-configuring one or more of the first and second pins of the timing-leader component and first and second pins of the timing-follower component after detecting the cumulative time delay for use in a normal mode. Also, the process 130 may include transmitting a Time of Day (ToD) clock signal from the timing-leader component to the timing-follower component. The process 130 can also include utilizing the cumulative time delay to compensate for inaccuracies of the ToD clock signal on the timing-follower component.

The round-trip number may be equal to an integer multiple of the width, in nanoseconds, of one cycle of the timestamping clock signal. The synchronization may be configured to eliminate a beat effect for correcting time-stamping inaccuracies when the timing-leader component and timing-follower component are not syntonized. The process 130 can also include the step of arranging the timing-leader component and the timing-follower component on a single circuit board or in a single chassis of a network element. For example, the process 130 may also include incorporating the single circuit board or single chassis in a fronthaul portion or edge of a 5G Radio Access Network (RAN). The process 130 may be configured to improve timestamping accuracy protocols with respect to one or more of Class C/D of ITU-T G.8273.2 and IEEE 802.3cx.

The 1 pps clock signal may have a pulse width of approximately 100 ms. Each of the timing-leader component and the timing-follower component may be configured as Field-Programmable Gate Array (FPGA) or Phase-Locked Loop (PLL) devices. The process 130 may also include utilizing the cumulative time delay to enable synchronization of a plurality of timing-follower components with the timing-leader component.

As opposed to conventional systems, the embodiments of the systems and methods of the present disclosure may configure the phase pin to be bidirectional so that it can be used to loop the phase signal for testing (e.g., performed every time the system is rebooted). Normally, conventional systems may have two pins for frequency and ToD distribution from the timing-leader (e.g., timing control FPGA) to the timing-follower (e.g., functional FPGA). The present disclosure is configured to re-purpose the frequency pin for 1 pps (e.g., only during the testing period). In normal operations, the lower pins are used for frequency information. The ToD pin direction may be reversed during testing period, but not for normal operation. The timing-leader to the timing-follower direction may be reconfigured to allow direction from the follower to the leader.

The algorithm of m*N times of looping, where m is an integer and N is the clock cycle value in nanoseconds (e.g., N=8 for 125 MHz, N=40 for 25 MHz, etc.) for calculating the average round-trip delay and one-way delay. The registers 110, 114 can be configured for recording the looping time and running (ongoing) time delay, where the total device values can be retrieved (e.g., by a user or by an internal detector 116 or external calculation device) to calculate the one-way delay and use it to compensate the ToD distribution.

In conventional systems, the one-way delay or round-trip delay measurements can have different values when using one different clock due to the clock granularity time error. However, the present disclosure is able to overcome this error to achieve a greater accuracy. Also, the delay measurements described herein will essentially be the same regardless of the clock frequency (e.g., 10 MHz, 25 MHz, 125 MHz, etc.) of the timestamping clock being used.

Also, the embodiments of the present disclosure can be implemented in a way that can reduce the cost of production of circuits for measuring delay and providing synchronization between the circuits. In addition, even with the cost-effective design, the present embodiments, as compared with conventional systems, are able to improve the measurement accuracy of Precision Time Protocol (PTP) and other clocking and timestamping protocols.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. Circuitry comprising:
    a timing-leader component configured to create a timestamping clock signal and a clock signal; and
    a timing-follower component connected to the timing-leader component and configured to be synchronized with the timing-leader component; and
    first and second links connected between the timing-leader component and the timing-follower component;
    wherein the timing-leader component is configured to
        determine a round-trip number based on a width of one cycle of the timestamping clock signal, the round-trip number is an integer that represents a plurality of times that the clock signal is to be transmitted electrically in a loop between the timing-leader component and the timing-follower component, and
        utilize the timestamping clock signal to detect a cumulative time delay that results when the clock signal is transmitted electrically in the loop a number of times equal to the round-trip number, the cumulative time delay is utilized for synchronization of the timing-follower component with the timing-leader component,
    wherein the timing-leader component includes a first pin, a second pin, and a first short connected between the first and second pins of the timing-leader component, wherein the timing-follower component includes a third pin, a fourth pin, and a second short connected between the first and second pins of the timing-follower component, and wherein the loop includes a path from the first pin of the timinig-leader component along the first link to the third pin of the timing-follower component, along the second short to the fourth pin of the timing-follower component, along the second link to the second pin of the timing-leader component, and along the first short to the first pin of the timing-leader component.

2. The circuitry of claim 1, wherein one or more of the first and second pins of the timing-leader component and the third and fourth pins of the timing-follower component are reconfigurable pins for operation in either a test mode or a normal mode.

3. The circuitry of claim 1, wherein the time-leader component is configured to transmit a Time of Day (ToD) clock signal to the timing-follower component.

4. The circuitry of claim 3, wherein the cumulative time delay is configured to compensate for inaccuracies of the ToD clock signal on the timing-follower component.

5. The circuitry of claim 1, wherein the round-trip number is equal to an integer multiple of the width, in nanoseconds, of one cycle of the timestamping clock signal.

6. The circuitry of claim 1, wherein the synchronization is configured to eliminate a beat effect for correcting timestamping inaccuracies when the timing-leader component and timing-follower component are not syntonized.

7. The circuitry of claim 1, further comprising the step of arranging the timing-leader component and the timing-follower component on a single circuit board or in a single chassis of a network element.

8. The circuitry of claim 7, further comprising the step of incorporating the single circuit board or single chassis in a fronthaul portion or edge of a 5G Radio Access Network (RAN).

9. The circuitry of claim 8, wherein the method is configured to improve timestamping accuracy protocols with respect to one or more of Class C/D of ITU-T G.8273.2 and IEEE 802.3cx.

10. The circuitry of claim 1, wherein the clock signal has a pulse width of approximately 100 ms.

11. The circuitry of claim 1, wherein each of the timing-leader component and the timing-follower component is configured as a Field-Programmable Gate Array (FPGA) or a Phase-Locked Loop (PLL).

12. A method comprising the steps of:
    determining a round-trip number based on a width of one cycle of a timestamping clock signal, the round-trip number is an integer that represents a plurality of times that a clock signal is to be transmitted electrically in a loop from a timing-leader component to a timing-follower component and back to the timing-leader component;
    utilizing the timestamping clock signal to detect a cumulative time delay that results when the clock signal is transmitted electrically in the loop a number of times equal to the round-trip number, wherein the cumulative time delay is utilized for synchronization of the timing-follower component with the timing-leader component;
    configuring a first pin of the timing-leader component as an output test pin and configuring a second pin of the timing-leader component as an input test pin;
    connecting a first short between the first and second pins of the timing-leader component;

configuring a third pin of the timing-follower component as an input test pin and configuring a fourth pin of the timing-followe component as an output test pin; and connecting a second short between the third and fourth pins of the timing-follower component;

wherein the loop includes a path from the first pin of the timing-leader component along a first link to the third pin of the timing-follower component, along the second short to the fourth pin of the timing-follower component, along a second link to the second pin of the timing-leader component, and along the first short to the first pin of the timing-leader component.

13. The method of claim 12, further comprising the steps of:

transmitting a Time of Day (ToD) clock signal from the timing-leader component to the timing-follower component; and utilizing the cumulative time delay to compensate for inaccuracies of the ToD clock signal on the timing-follower component.

14. The method of claim 12, wherein the round-trip number is equal to an integer multiple of the width, in nanoseconds, of one cycle of the timestamping clock signal.

15. The method of claim 12, wherein the synchronization is configured to eliminate a beat effect for correcting timestamping inaccuracies when the timing-leader component and timing-follower component are not syntonized.

16. The method of claim 12, further comprising the steps of:

arranging the timing-leader component and the timing-follower component on a single circuit board or in a single chassis of a network element;

incorporating the single circuit board or single chassis in a fronthaul portion or edge of a 5G Radio Access Network (RAN); and utilizing the cumulative time delay to determine a one-way delay, wherein determining the one-way delay improves timestamping accuracy protocols with respect to one or more of Class C/D of ITU-T G.8273.2 and IEEE 802.3cx.

17. The method of claim 12, wherein each of the timing-leader component and the timing-follower component is configured as a Field-Programmable Gate Array (FPGA) or a Phase-Locked Loop (PLL).

18. The method of claim 12, further comprising the step of utilizing the cumulative time delay to enable synchronization of a plurality of timing-follower components with the timing-leader component.

* * * * *